United States Patent Office 3,824,280
Patented July 16, 1974

3,824,280
PRODUCTION OF N-(1-ALKENYL)-CARBAMOYL COMPOUNDS
Hans Kiefer, Wachenheim, Wolfgang Rohr, Mannheim, and Herbert Naarmann, Ludwigshafen, Germany, assignors to Badische Anilin- & Soda-Fabrik Aktiengesellschaft, Ludwigshafen (Rhine), Germany
No Drawing. Filed Aug. 18, 1971, Ser. No. 172,934
Claims priority, application Germany, Aug. 27, 1970, P 20 42 497.1
Int. Cl. C07c 51/58
U.S. Cl. 260—544 C        2 Claims

ABSTRACT OF THE DISCLOSURE

The production of N-(1-alkenyl)-carbamoyl compounds by reaction of a Schiff base with an acid chloride with or without elimination of hydrogen chloride from the end product, and the new N-(1-alkenyl)-carbamoyl and N-(1,3-dialkenyl)-carbamoyl compounds themselves. The new N-(1-alkenyl)-carbamoyl and N-(1,3-dialkenyl)-carbamoyl compounds which can be prepared by the process of the invention are valuable starting materials for the production of surface coating intermediates, plastics, paints and plant protection agents.

The invention relates to a process for the production of N-(1-alkenyl)-carbamoyl compounds by reaction of a Schiff base with an acid chloride, with or without subsequent elimination of hydrogen chloride from the end product, and to new substances of this type.

It is known from Rec. Trav. Chem. Pays-Bas, volume 79 (1960, pages 1197 et seq.) that organic acid chlorides can be added on to N-propylpropanaldimine to form the corresponding N-(1-chloropropyl)-N-propylic acid amides. On heating with triethylamine, these adducts lose hydrogen chloride and are converted into the corresponding N-(1-propenyl)-N-propylic acid amides. It is stated that acid chlorides which react with triethylamine, for example acetyl chloride, first have to be reacted with a Schiff base and only after this reaction (addition) can the base be added. Reaction of silicon tetrachloride or sulfuryl chloride instead of an organic acid chloride does not proceed in the said manner and gives different end products.

It is known from a work in J. Org. Chem., volume 33, pages 2357 et seq. (1968) that N-alkyl-N-cyclohexylidenamines can be reacted with acid chlorides to N-acylated enamides.

It is an object of the invention to provide a new process for producing a large number of new N-(1-alkenyl)-carbamoyl compounds in good yields and purity by a simple and economical method.

Another object of the invention is new N-(1-alkenyl)-carbamoyl and N-(1,3-alkadienyl)-carbamoyl compounds.

We have found that N-(1-alkenyl)-carbamoyl compounds having the general formula:

$$Cl—(CH_2)_n—CO—N—\underset{R^2}{\underset{|}{C}}=\underset{R^2}{\underset{|}{C}}—\underset{Cl}{\underset{|}{C}}—\underset{H}{\underset{|}{C}}—R^2 \quad (I)$$

where
R$^1$ denotes an aliphatic, cycloaliphatic, araliphatic or aromatic radical, the individual radicals R$^2$ may be identical or different and each denotes a hydrogen atom or an aliphatic radical and $n$ denotes zero or 1 are obtained advantageously by reacting a Schiff base having the general formula:

$$\underset{R^2}{\underset{|}{N}}=\underset{R^2}{\underset{|}{C}}—\underset{H}{\underset{|}{C}}—R^2 \quad (II)$$

in which R$^1$ and R$^2$ have the meanings given above with an acid chloride having the general formula:

$$Cl—(CH_2)_n—CO—Cl \quad (III)$$

in which $n$ has the meanings given above.
The end products (I) thus obtained may be converted into N-(1,3-alkadienyl)-carbamoyl compounds having the general formula:

$$Cl—(CH_2)_n—CO—N—\underset{R^2}{\underset{|}{C}}=\underset{R^2}{\underset{|}{C}}—\underset{}{\underset{}{C}}=\underset{}{\underset{}{C}}—R^2 \quad (IV)$$

in which R$^1$, R$^2$ and $n$ have the meanings given above by eliminating hydrogen chloride by a known method.
When N-tert-butylcrotonylidenimine and phosgene are used, the reaction may be represented by the following formulae:

$$CH_3—\underset{H_3C}{\underset{|}{C}}—N=\underset{H}{\underset{|}{C}}—CH=CH—CH_3 + COCl_2 \longrightarrow$$

$$CH_3—\underset{H_3C}{\underset{|}{C}}—N—CH=CH—CH—CH_3$$
$$\underset{COCl}{|} \quad \underset{Cl}{|}$$

$$CH_3—\underset{H_3C}{\underset{|}{C}}—N—CH=CH—CH=CH_2 + HCl$$
$$\underset{COCl}{|}$$

Having regard to the state of the art, the process gives a large number of new N-(1-alkenyl)-carbamoyl compounds in good yields and high purity by a simple and economical method. It could not have been foreseen that the reaction would proceed in a uniform manner and that the halogen atom of the acid chloride would not enter into the molecule in the α-position but in the γ-position. It is also surprising when using phosgene (which is a bifunctional acid chloride) that in spite of its two reactive chlorine atoms, it does not react twice with the Schiff base.

The starting materials used are Schiff bases from aldehydes or ketones which are unsaturated in α-position with primary amines having the general formula (II), and phosgene or chloroacetyl chloride as acid chlorides (III). Preferred starting materials (II), starting materials (III) and consequently preferred end products (I) and N-(1,3-alkadienyl)-carbamoyl compounds (IV) are those in whose formulae the radical R$^1$ denotes an alkyl radical having one to ten carbon atoms, a cycloalkyl radical having five to twelve carbon atoms, a naphthyl radical or a phenyl radical, the individual radicals R$^2$ may be identical or different and each denotes a hydrogen atom or an alkyl radical having one to four carbon atoms and $n$ denotes zero or 1. R$^1$ may also denote a saturated or unsaturated polycycloalkyl radical, particularly a bicycloalkyl radical having seven to ten carbon atoms or a tricycloalkyl radical having seven to twelve carbon atoms. The said radicals may bear, as substituents, groups and/or atoms which are inert under the reaction conditions, for example fluorine, bromine or chlorine atoms, trifluoroalkyl, alkoxy, alkylthio, acetoxy, alkyl and alkylsulfonyl groups having in each case one to four carbon atoms, or nitro groups.

Examples of Schiff bases which may be used as starting materials (II) are as follows: the isopropylimines, cyclohexylimines, n-propylimines, benzylimines, methylimines, ethylimines, n-propylimines, n-butylimines, tert-butylimines, 2-ethylhexylimines, 1-octadecylimines, methylcyclohexylimines, cyclooctylimines, cyclododecylimines, tetrahydrodicyclopentadienylimines, o-toluylimines, m- toluylimines, p-toluylimines, o-bromophenylimines, o-chlorophenylimines, 3,4-dichlorophenylimines, m-methylsulfonylphenylimines, p-chlorophenoxyphenylimines, p-fluorophenylimines, 2-methoxypropylimines, secondary butylimines, 1-methylbutyn-2-ylimines, α-methoxy-tert-butylimines, α-methylthio-tert-butylimines, α-chloro-tert-butylimines, tertiary amylimines, cyclopentylimines, 1-methylcyclopentylimines, bicyclo - [2,2,1]-heptylimines, tetrahydrodicyclopentadienylimines, phenylimines, o-trifluoromethylphenylimines, 4 - methoxy - 3-chlorophenylimines, o, o' - diethylphenylimines, o,o' - dimethylphenylimines, and o,o'-methylethylphenylimines of crotonaldehyde, 2-methylcrotonaldehyde, 3-methylcrotonaldehyde, 2-ethylcrotonaldehyde, 2-methylpenten-2-al-1, 2-ethylhexen-2-al-1, mesityl oxide and methyl-1-propenyl ketone.

The starting materials may be prepared for example by the methods described in Tetrahedron, 19 (1963), 1685–1689, and in Hoube-Weyl, "Methoden der organischen Chemie," volume 11/1, page 334. The starting material (II) may be reacted with phosgene or chloroacetyl chloride in the stoichiometric amount or in excess, for example in the ratio of from 1 to 1.5 moles of starting material (III) per mole of starting material (II).

The reaction is advantageously carried out at a temperature of from −30° to +50° C., preferably from −20° to +20° C., at atmospheric or superatmospheric pressure, continuously or batchwise. Organic solvents which are inert under the reaction conditions are used as a rule; these may be hydrocarbons, for example benzene or toluene; chlorohydrocarbons, for example carbon tetrachloride or trichloroethylene; ethers, for example diethyl ether or dioxane; alicyclic or aliphatic hydrocarbons, for example cyclohexane or ligroin; or mixture of these solvents.

The reaction may be carried out as follows: starting material (III) and a solvent are placed in a vessel and starting material (II), with or without a solvent, is added to the mixture during one hour to three hours. It is advantageous to stir the mixture for another half hour to four hours after the addition. The solvent is then distilled off. If necessary unreated phosgene may be previously removed from the reaction mixture, for example by passing in a stream of nitrogen. The end product is isolated from the residue by a known method, for example by recrystallization from ligroin.

Conversion of the end product (I) by elimination of hydrogen chloride into the secondary product (IV) can be carried out in any way, for example by heating for one hour to five hours at sub atmospheric pressure at a temperature of from 60° to 250° C., particularly from 80° to 170° C., and a pressure of from 0.1 to 760 mm. of Hg. Similarly the end product (I) may be reacted for one hour to five hours at a temperature of from 60° to 250° C., an inert gas, for example nitrogen, being passed through the reaction chamber. The N-(1,3-alkadienyl)-carbamoyl compound (IV) is then isolated from the reaction mixture in the usual way, for example by distillation or crystallization. To avoid spontaneous polymerization it is advantageous to add an inhibitor, for example thiodiphenylamine or hydroquinone, during the dehydrochlorination and distillation. For the production of the substance (IV) it is not necessary first to isolate the end product (I). For example if the adding on of the starting material (III) is carried out in a solvent having a boiling point above 70° C., the substance (IV) may be obtained by appropriate heating of the reaction mixture during one hour to five hours while passing an inert gas through the same.

The new compounds (I) and the secondary products (IV) which can be prepared by the process of the invention are valuable starting materials for the production of surface coating intermediates, plastics, paints and plant protection agents. For example the compounds (IV) may be copolymerized with acrylic esters. Butadienylcarbamoyl chlorides (IV) are particularly well suited for the production of both homopolymers and copolymers. Copolymers with ethylene, butadiene, styrene and acrylic esters of methanol, ethanol, propanol, butanol and ethylcyclohexanol in an amount of from 0.1 to 50%, preferably from 1 to 25%, by weight based on the copolymer are of special industrial interest. The polymerization may be initiated by the usual free-radical-generating initiators, such as dibenzoyl peroxide, ditert-butyl peroxide or azodiisobutyronitrile. For details of copolymerizations, reference is made to Houben-Weyl, "Methoden der organischen Chemie," volume 14/1, (1961), page 24.

The copolymers may be used as coatings or films on building materials, for example wooden, stone or concrete surfaces. The production of such coatings or films may be carried out in any manner by known methods. (Ullmanns Encyklopädie der technischen Chemie, volume 11 (1960), pages 283, 367 et seq.) Crosslinking agents for polyamines may also be prepared from the substances (IV) by polymerization. Crosslinking of polyamines may be carried out for example by the methods described in the said volume of Houben-Weyl. The polymers may also be used for the production of moldings or adhesives.

The following Examples illustrate the invention. The parts given in the following Examples are parts by weight.

EXAMPLE 1

N-3-chlorobuten-1,3-yl-1-N-tert-butylcarbamoyl chloride

A solution of 750 parts of N-tert-butylcrotonylidenimine in 750 parts of ligroin is added in the course of two hours to a solution of 660 parts of phosgene in 2000 parts of dry ligroin having a boiling range of from 60° to 80° C., at a temperature of 0° to 5° C. while stirring. The reaction mixture is left for another two hours at 10° to 20° C., excess phosgene is expelled by passing in nitrogen, and the solvent is evaporated in vacuo at a temperature of from 30° to 40° C. 1080 parts (96% of theory) of pure N-3-chlorobuten-1-yl-1-N-tert-butylcarbamoyl chloride is obtained as a residue.

EXAMPLE 2

N-butadiene-1,3-yl-1-N-tert-butylcarbamoyl chloride 225 parts of the end product obtained according to Example 1 is heated in vacuo in a distillation apparatus for two hours at 110° C. After this period the elimination of hydrogen chloride has ceased and the residue is distilled in vacuo. 176 parts (94% of theory) of N-butadiene-1,3-yl-1-N-tert-butylcarbamoyl chloride is obtained having a boiling point at 0.8 mm. of Hg: of 83° C.

EXAMPLE 3

225 parts of the end product (I) obtained according to Example 1 is heated for four hours at 80° to 90° C. while passing nitrogen through. 165 parts (88% of theory) of N-butadiene-1,3-yl-1-tert-butylcarbamoyl chloride is obtained by distillation in vacuo. Boiling point at 0.5 mm. of Hg: 81° C.

EXAMPLE 4

N-butadien-1,3-yl-1-N-isopropylcarbamoyl chloride 167 parts of N-isopropylcrotonylidenimine is reacted with phosgene as described in Example 1. After removal of the solvent and elimination of hydrogen chloride as described in Example 2, 153 parts of N-butadienyl-1,3-N-isopropylcarbamoyl chloride is obtained by distillation (61% of theory); boiling point at 0.7 mm. of Hg: 73° C.

EXAMPLE 5

N-3-chloro-2-ethylhexen-1-yl-1-N-phenylcarbamoyl chloride

A solution of 201 parts of the Schiff base from aniline and 2-ethylhexen-2-al-1 is introduced at 5° to 10° C. in the course of one hour into a solution of 109 parts of phosgene in 250 parts of dioxane while stirring continuously. The whole is stirred for another hour and the solvent is removed as described in Example 4. 288 parts (96% of theory) of N-3-chloro-2-ethylhexen-1-yl-1-N-phenylcarbamoyl chloride is obtained; boiling point at 0.15 mm. of Hg: 138° C.

EXAMPLE 6

N-2-ethylhexadien-1,3-yl-1-N-phenylcarbamoyl chloride 300 parts of the end product (I) prepared according to Example 5 is heated in vacuo as described in Example 2 until the end of the elimination of hydrogen chloride, and then distilled. 243 parts of N-2-ethylhexadien-1,3-yl-1-N-phenylcarbamoyl chloride having a boiling point at 0.15 mm. of 138° C. is obtained by subsequent distillation.

EXAMPLE 7

N-3-chlorobuten-1-yl-1-N-o,o'-diethylphenylcarbamoyl chloride 40 parts of N-o,o'-diethylphenylcrotonylidenimine is is added to a solution of 40 parts of phosgene in 150 parts of dioxane at 10° to 15° C. in the course of thirty minutes while stirring. The temperature is allowed to rise to 20° C. in the course of thirty minutes, excess phosgene is expelled by means of a stream of nitrogen and the solvent is removed at temperatures below 50° C. in vacuo. 57 parts of N-3-chlorobuten-1-yl-1-N-o,o'-diethylphenylcarbamoyl chloride is obtained as a residue in the form of a pale reddish oily liquid (95% of theory).

EXAMPLE 8

N-butadien-1,3-yl-1-N-o,o'-diethylphenylcarbamoyl chloride 300 parts of the end product (I) prepared according to Example 7 is heated in vacuo at 170° C. until hydrogen chloride has been completely eliminated as described in Example 2 and then distilled in vacuo. 253 parts of N-butadien-1,3-yl-1-N-o,o'-diethylphenylcarbamoyl chloride having a boiling point at 0.5 mm. of 130° to 135° C. is isolated (96% of theory).

EXAMPLE 9

N-3-chlorobuten-1-yl-1-N-o,o'-diethylphenylchloroacetamide 603 parts of N-o,o'-diethylphenylcrotonylidenimine in 1000 parts of toluene is added at −5° to 0° C. in the course of one hour to a solution of 440 parts of chloroacetyl chloride in 500 parts of toluene while stirring. The reaction mixture is stirred for another hour at room temperature and the solvent is removed in vacuo. The residue is crystallized from ligroin. 640 parts of N-3-chlorobuten-1-yl-1-N - o,o' - diethylphenylchloroacetamide is obtained having a melting point of 61° to 64° C.

EXAMPLE 10

N-butadien-1,3-yl-1-N-o,o'-diethylphenylchloroacetamide 60.3 parts of N-o,o'-diethylphenylcrotonylidenimine is reacted with chloroacetyl chloride as described in Example 9. 0.5 part of thiodiphenylamine is added to the reaction mixture which is then heated for 2½ hours under reflux in a stream of nitrogen. The solvent is removed and the residue is distilled. 65 parts of N-butadien-1,3-yl-1-N-o,o'-diethylphenylchloroacetamide chloride having a boiling point at 0.3 mm. of 155° C. is obtained (71% of theory).

EXAMPLE 11 (USE)

1500 parts of toluene and 10 parts of azodiisobutyronitrile are added to 100 parts of N-butadien-1,3-yl-1-N-tert-butylcarbamoyl chloride. Butadiene is forced into this mixture in an autoclave at 90° C. until the pressure in the gas space is 6 atmospheres. After a reaction period of eight hours, the solution has a dry content of 27% by weight. The copolymer has a content of 16.5% by weight of carbamoyl chloride and a K value of 94.

EXAMPLE 12 (USE)

Polymerization is carried out as described in Example 11 but with ethylene instead of butadiene. After a reaction period of eight hours, a solution is obtained which has a dry content of 21% by weight. The K value of the copolymer is 52.5 (determined in a 1% by weight solution in decahydronaphthalene). The content of copolymerized carbamoyl chloride is 12.8% by weight.

EXAMPLE 13 (USE)

100 parts of the copolymer from Example 12 has 100 parts of toluene and 0.5 part of p-toluenesulfonic acid added to it and the whole is heated for five hours under reflux. Tert.-butyl chloride is thus eliminated and a polymer is formed which contains isocyanate groups. The product obtained decolorizes iodine, has a hydrogenation iodine number of 31 and exhibits double bond bands in the infrared spectrum. The product may be copolymerized with styrene, butadiene and acrylonitrile.

EXAMPLE 14 (USE)

Polymerization is carried out as described in Example 11 but the butadiene is replaced by 270 parts of styrene. After a reaction period of eight hours, 280 parts of a copolymer is obtained which has a K value (determined in a 0.5% solution in toluene) of 63 and a carbamoyl chloride content of 3.5% by weight.

EXAMPLE 15 (USE)

A copolymer is prepared as described in Example 14 and tert.-butyl chloride is eliminated as described in Example 13. The end product containing isocyanate groups may be advantageously copolymerized with butadiene and acrylonitrile and crosslinked with polyols or polyamines. For example when 1 part of 2,2-bis-(4-hydroxyphenyl)-propane or 1 part of p-phenylenediamine is added to 10 parts of the copolymer there is formed by heating to 130° C. a coating composition which can be used on wood to give a coating which is not soluble either in toluene or in acetone.

What we claim is:

1. A N-(1-alkenyl)-carbamoyl compound having the formula $$Cl-CO-N(R^1)-C(R^2)=C(R^2)-C(Cl)(R^3)-C(R^3)(H)-R^3 \quad (I)$$

in which

R$^1$ denotes a hydrocarbon radical selected from the group consisting of alkyl of 1 to 10 carbon atoms, cycloalkyl of 5 to 12 carbon atoms, polycycloalkyl of 7 to 12 carbon atoms, phenyl and naphthyl, which radicals may further bear an inert substituent selected from the group consisting of fluorine, chlorine, bromine, nitro, trifluoroalkyl, alkoxy, alkylthio, acetoxy, alkyl and alkylsulfonyl with each alkyl group being of 1 to 4 carbon atoms, and R$^2$ denotes hydrogen or alkyl of 1 to 4 carbon atoms.

2. A N-(1,3-alkadienyl)carbamoyl compound having the formula $$Cl-CO-N(R^1)-C(R^2)=C(R^2)-C(R^2)=C(R^3)-R^3 \quad (IV)$$

in which

R$^1$ denotes a hydrocarbon radical selected from the group consisting of alkyl of 1 to 10 carbon atoms, cycloalkyl of 5 to 12 carbon atoms, polycycloalkyl of 7 to 12 carbon atoms, phenyl and naphthyl, which radicals may further bear an inert substituent selected from the group consisting of fluorine, chlorine, bromine, nitro, trifluoroalkyl, alkoxy, alkylthio, acetoxy, alkyl and alkylsulfonyl with each alkyl group being of 1 to 4 carbon atoms, and R$^2$ denotes hydrogen or alkyl of 1 to 4 carbon atoms.

(References on following page)

References Cited

UNITED STATES PATENTS

| | | | |
|---|---|---|---|
| 3,501,523 | 3/1970 | Sayigh et al. | 260—544 C |
| 2,430,897 | 11/1947 | Van Atta et al. | 260—486 D X |

FOREIGN PATENTS

| | | | |
|---|---|---|---|
| 1,157,210 | 11/1963 | West Germany | 260—544 C |
| 744,409 | 7/1970 | Belgium | 260—544 C |

OTHER REFERENCES

Breedeveld: *Rec. Trav. Chem. Pays-Bas* (1960), pp. 1197–1202.

LORRAINE A. WEINBERGER, Primary Examiner

R. D. KELLY, Assistant Examiner

U.S. Cl. X.R.

117—148; 260—490, 77.5